(12) United States Patent
Rozas et al.

(10) Patent No.: US 7,606,997 B1
(45) Date of Patent: Oct. 20, 2009

(54) METHOD AND SYSTEM FOR USING ONE OR MORE ADDRESS BITS AND AN INSTRUCTION TO INCREASE AN INSTRUCTION SET

(76) Inventors: Guillermo Rozas, 104 Magneson Ter., Los Gatos, CA (US) 95032; Alexander Klaiber, 231 Sierra Vista Ave., Mountain View, CA (US) 94043; Eric Hao, 20771 Scofield Dr., Cupertino, CA (US) 95014

( * ) Notice: Subject to any disclaimer, the term of this patent is extended or adjusted under 35 U.S.C. 154(b) by 225 days.

(21) Appl. No.: 10/623,101

(22) Filed: Jul. 18, 2003

(51) Int. Cl.
*G06F 9/30* (2006.01)
(52) U.S. Cl. .................................................. 712/209
(58) Field of Classification Search ................ 712/209, 712/227
See application file for complete search history.

(56) References Cited

U.S. PATENT DOCUMENTS

| | | | |
|---|---|---|---|
| 4,259,718 A | 3/1981 | Kaman et al. |
| 4,312,036 A | 1/1982 | Porter et al. |
| 4,314,331 A | 2/1982 | Porter et al. |
| 4,371,927 A | 2/1983 | Wilhite et al. |
| 4,491,908 A | 1/1985 | Woods et al. |
| 5,057,837 A | 10/1991 | Colwell et al. |
| 5,115,500 A * | 5/1992 | Larsen ........................ 712/209 |
| 5,129,066 A | 7/1992 | Schmookler |
| 5,179,680 A | 1/1993 | Colwell et al. |
| 5,301,341 A | 4/1994 | Vassiliadis et al. |
| 5,325,495 A | 6/1994 | McLellan |
| 5,418,970 A | 5/1995 | Gifford |
| 5,485,629 A | 1/1996 | Dulong |
| 5,555,428 A | 9/1996 | Radigan et al. |
| 5,649,135 A | 7/1997 | Pechanek et al. |
| 5,832,205 A | 11/1998 | Kelly et al. |
| 5,857,103 A | 1/1999 | Grove |
| 5,862,398 A | 1/1999 | Hampapuram et al. |
| 5,925,123 A | 7/1999 | Tremblay et al. |
| 5,974,539 A | 10/1999 | Guttag et al. |
| 6,041,399 A | 3/2000 | Terada et al. |
| 6,065,106 A | 5/2000 | Deao et al. |
| 6,101,592 A | 8/2000 | Pechanek et al. |
| 6,112,299 A | 8/2000 | Ebcioglu et al. |
| 6,202,142 B1 | 3/2001 | Narayan et al. |
| 6,202,143 B1 | 3/2001 | Rim |
| 6,230,260 B1 | 5/2001 | Luick |
| 6,282,633 B1 | 8/2001 | Killian et al. |
| 6,317,872 B1 | 11/2001 | Gee et al. |
| 6,343,373 B1 | 1/2002 | Koizumi et al. |
| 6,397,379 B1 | 5/2002 | Yates, Jr. et al. |
| 6,442,701 B1 | 8/2002 | Hurd |
| 6,453,407 B1 | 9/2002 | Lavi et al. |
| 6,571,386 B1 | 5/2003 | Figurin et al. |
| 6,618,804 B1 | 9/2003 | Steele, Jr. et al. |

(Continued)

OTHER PUBLICATIONS

Enterprise Systems Architecture/390 Principles of Operation. Eighth edition, Jul. 2001. pp. 7-1 to 7-5, 9-1 to 9-4, and 9-8 to 9-9.*

(Continued)

*Primary Examiner*—Eddie P Chan
*Assistant Examiner*—Jacob Petranek

(57) ABSTRACT

A method and system for expanding an instruction set by decoding an instruction located at a particular address using one or more of those address bits in conjunction with the instruction word.

14 Claims, 3 Drawing Sheets

U.S. PATENT DOCUMENTS 6,658,551 B1  12/2003  Berenbaum et al.
6,871,274 B2   3/2005  Nunomura

OTHER PUBLICATIONS

Title: Architecture and compiler tradeoffs for a long instruction wordprocessor, author: Cohn et al, ACM 1989.
Final Office Action Dated Jun. 25, 2003; Patent No. 6738892.
Non-Final Office Action Dated Apr. 11, 2002; Patent No. 6738892.
Non-Final Office Action Dated Dec. 20, 2002; Patent No. 6738892.
Notice of Allowance Dated Dec. 22, 2003; Patent No. 6738892.
Final Office Action Dated May 2, 2003; Patent No. 6754892.
Non Final Office Action Dated Nov. 25, 2002; Patent No. 6754892.
Notice of Allowance Dated Oct. 27, 2003; Patent No. 6754892.
Final Office Action Dated Apr. 11, 2008; U.S. Appl. No. 10/672,790.
Final Office Action Dated Dec. 20, 2006; U.S. Appl. No. 10/672,790.
Non Final Office Action Dated Jun. 26, 2006; U.S. Appl. No. 10/672,790.
Non Final Office Action Dated Sep. 24, 2007; U.S. Appl. No. 10/672,790.
Issue Notification Dated May 18, 2004; Patent No. 6738892.
Issue Notification Dated Jun. 22, 2004; Patent No. 6754892.
Restriction Requirement Dated Jun. 12, 2007; U.S. Appl. No. 10/672,790.
Ozer et al., A Fast Interrupt Handling Scheme for VLIW Processors, Oct. 12-18, 1998, Proceedings of International Conference on Parallel Architectures and Compilation Techniques, pp. 136-141.
Title: A VLIW architecture for a trace scheduling compiler, author: Colwell et al, ACM, 1987.
Title: Combining as a compilation technique for VLIW architectures, Author: Nakatani et al, ACM, 1989.
Title: Core-Based RNS ALU with customized instructions, author: Ray, IEEE, 1990.
Title: RISC I: a reduced instruction set VLSI computer, author: Patterson, ACM, 1998.
Final Office Action Dated Jun, 25, 2003; Patent No. 6738892; TRAN-P021.

\* cited by examiner

METHOD AND SYSTEM FOR USING ONE OR MORE ADDRESS BITS AND AN INSTRUCTION TO INCREASE AN INSTRUCTION SET

BACKGROUND OF THE INVENTION

Field of the Invention

The present invention generally relates to computer architecture. More particularly, the present invention relates to the field of increasing an instruction set by using one or more address bits and an instruction.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details.

At any point in time, a processor executes a particular function chosen from a set of functions. The particular function chosen is determined by how the processor decodes each instruction in memory. Thus, the "meaning" of an instruction is the selection of particular function as a result of the instruction decoding. Traditionally, the meaning of an instruction depends solely on the bits forming the instruction word stored in memory. In accordance with one embodiment of the present invention, the meaning of an instruction is additionally dependent on some or all of the address at which the instruction is stored.

Figure 1:
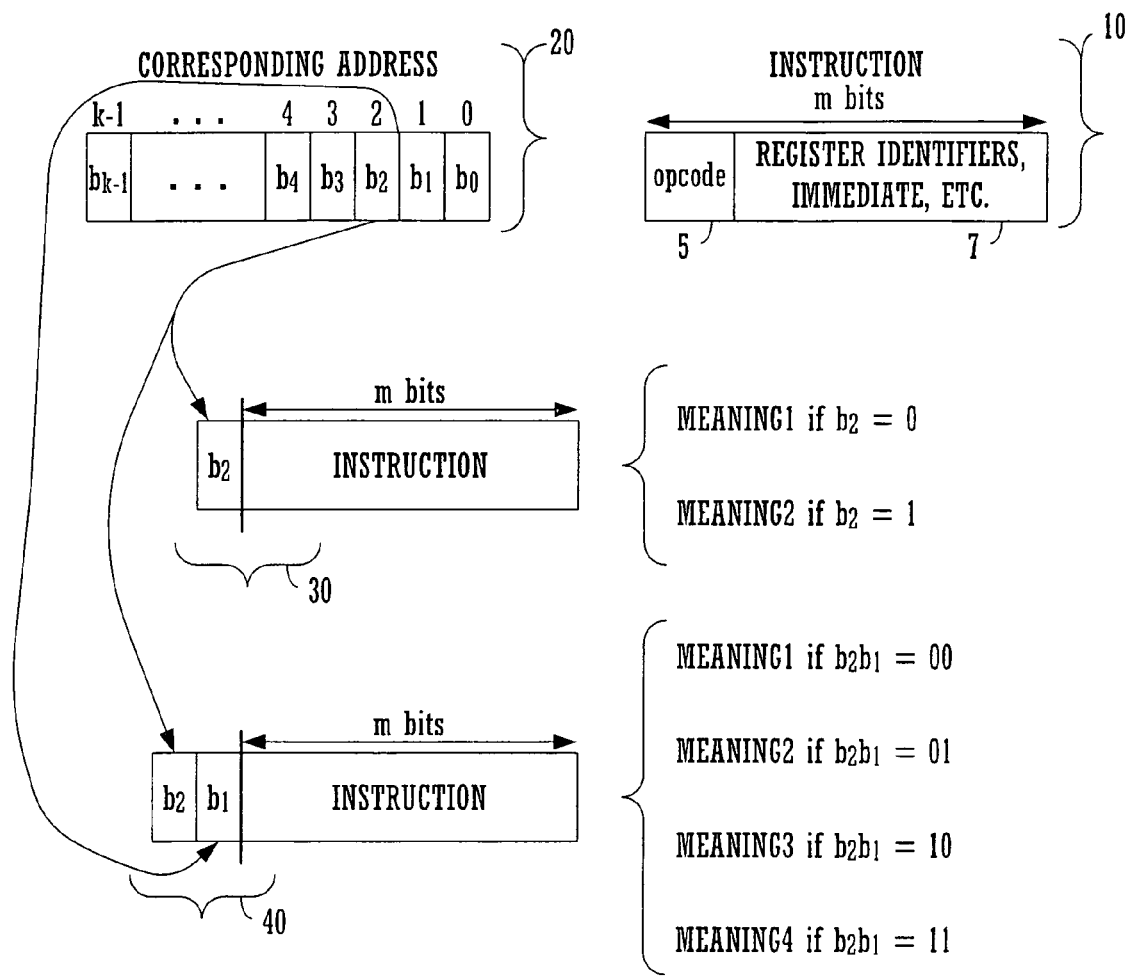
FIG. 1 illustrates an instruction, a corresponding address, and a plurality of concatenations of a portion of the corresponding address and the instruction in accordance with an embodiment of the present invention.

FIG. 1 illustrates an instruction 10, a corresponding address 20 at which instruction 10 is stored, and a plurality of concatenations 30 and 40 of a portion of the corresponding address 20 and the instruction 10 in accordance with an embodiment of the present invention. Rather than increasing an instruction set by increasing the size of the instruction 10, the instruction set is increased by utilizing one or more bits from the corresponding address 20 of the instruction 10 in memory.

The instruction 10 has m bits. Exemplary values for m are 16, 32, 64, and 128. The instruction 10 includes an opcode portion 5 and a portion 7 for register identifiers, an immediate, etc.

The corresponding address 20 is provided to memory to access the instruction 10. The corresponding address 20 has k bits. Exemplary values for k are 16, 32, 64, and 128.

In accordance with the present invention, a plurality of possible meanings is associated with instruction 10. That is, the same bit pattern of the instruction 10 can lead to any one of several meanings which then controls instruction execution by a processor. The desired meaning is determined by concatenating one or more bits from the corresponding address 20 to the instruction 10. As shown in FIG. 1 the concatenation 30 is comprised of $b_2$ from the corresponding address 20 concatenated to the instruction 10. Hence, if $b_2=0$, the instruction 10 obtains the meaning1. Similarly, if $b_2=1$, the instruction 10 obtains the meaning2. For example, meaning1 can correspond to an integer instruction while meaning2 can corresponding to a floating point instruction. Moreover, a particular bit from the corresponding address 20 can be selected whose value would indicate whether the corresponding address 20 was an even address or an odd address.

In one embodiment, the concatenation 40 is comprised of $b_2 b_1$ from the corresponding address 20 concatenated to the instruction 10. Hence, if $b_2 b_1=00$, the instruction 10 obtains the meaning1. If $b_2 b_1=01$, the instruction 10 obtains the meaning2. Moreover, if $b_2 b_1=10$, the instruction 10 obtains the meaning3. Similarly, if $b_2 b_1=11$, the instruction 10 obtains the meaning4. It should be understood that other bits from the corresponding address 20 can be concatenated to the instruction 10.

The one or more bits from the corresponding address 20 can affect the meaning of the opcode portion 5 and the portion 7 for register identifiers, an immediate, etc. Moreover, the instruction set is increased without increasing the size of the instruction 10 in memory, or storing additional instructions.

Figure 2:
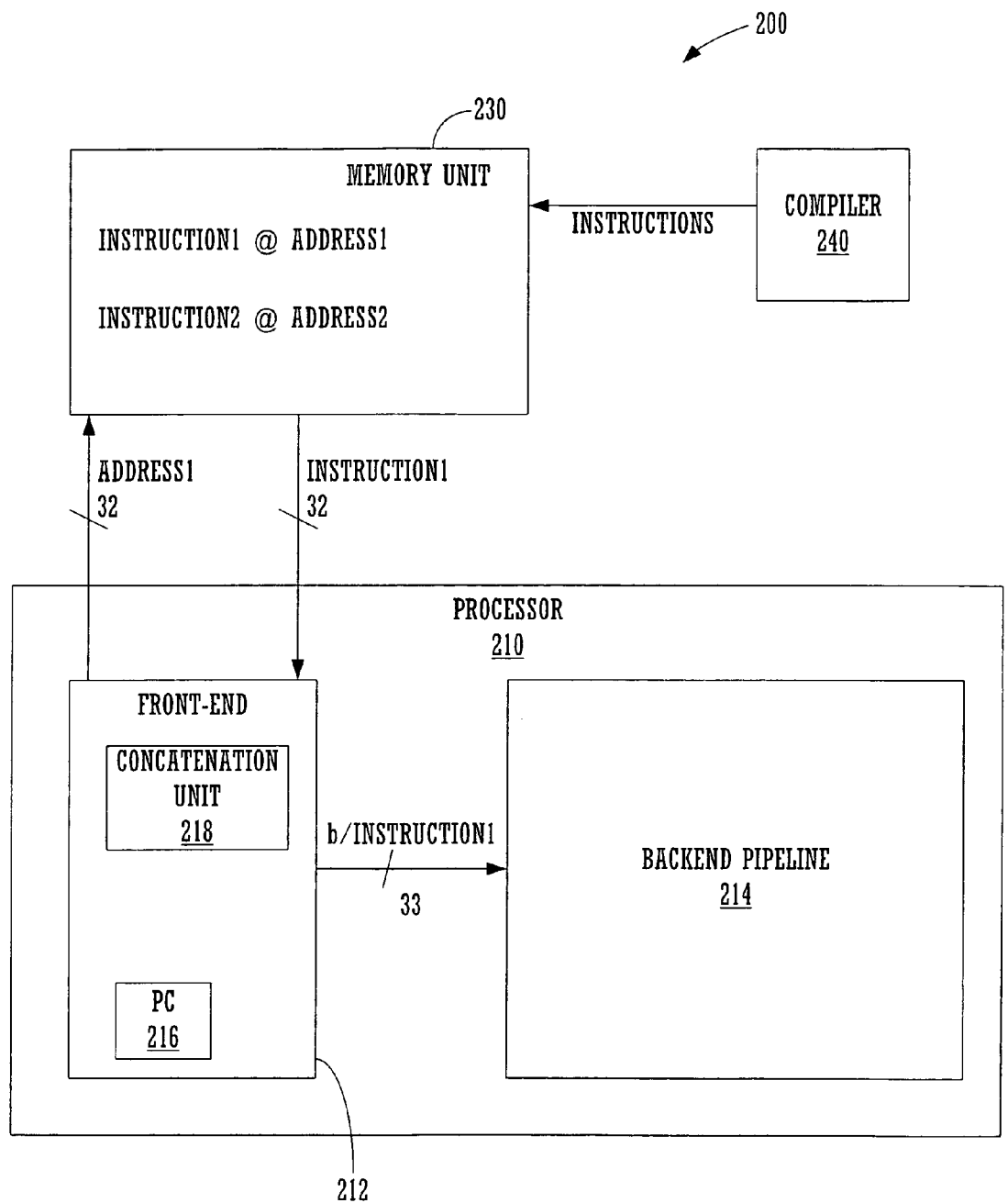
FIG. 2 illustrates a system in accordance with an embodiment of the present invention.

FIG. 2 illustrates a system 200 in accordance with an embodiment of the present invention. The system 200 includes a memory unit 230, a processor 210, and a compiler 240.

The memory unit 230 stores a plurality of instructions at a plurality of addresses. A plurality of possible meanings can be associated with each instruction. The compiler 240 generates the plurality of instructions and stores each instruction at an appropriate address in the memory unit 230 to facilitate the concatenation operation that determines the meaning of the instruction. For example, if an instruction needs to be stored at an even address to obtain a desired meaning, the compiler or translator ensures that it is stored at an even address. The compiler or translator does similar work for other alignments.

The processor 210 includes a front-end portion 212 and a backend pipeline portion 214. The front-end portion 212 includes a program counter 216 and a concatenation unit for concatenating a portion of the address to the instruction. Moreover, the front-end portion 212 provides the address to the memory unit 230 and receives the instruction from the memory unit 230. The backend pipeline portion 214 executes the concatenation comprised of a portion of the address and the instruction.

As described above, any portion of the address can be concatenated to the instruction to determine its meaning. Here, one bit from the address (32 bits) is concatenated to the instruction1 (32 bits) to form a concatenation (or extended instruction) having 33 bits. The concatenation (33 bits) is sent to the backend pipeline portion 214. The value of the bit from the address determines the meaning of the instruction.

Figure 3:
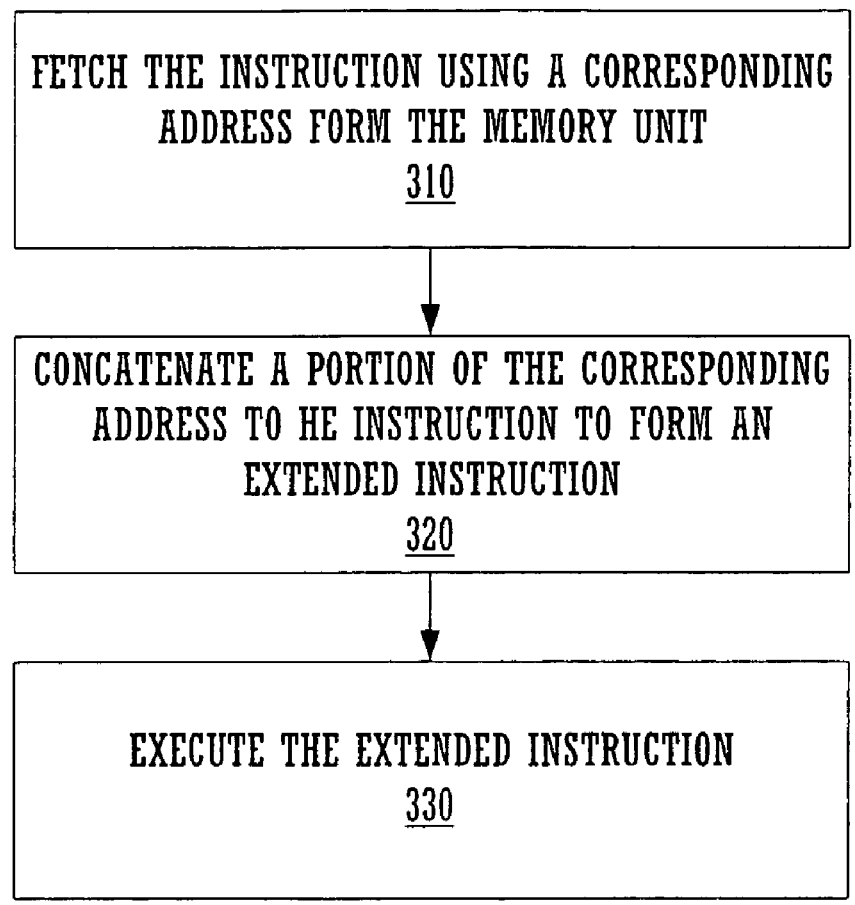
FIG. 3 illustrates a flow chart showing a method of processing an instruction in accordance with an embodiment of the present invention.

FIG. 3 illustrates a flow chart showing a method 300 of processing an instruction in accordance with an embodiment of the present invention. Reference is made to FIG. 2.

At Step 310, the processor 210 fetches the instruction using a corresponding address from the memory unit 230. A plurality of possible meanings is associated with the instruction.

Continuing, at Step 320, the processor 210 receives the instruction. Moreover, the processor concatenates a portion of the corresponding address to the instruction to form a concatenation (or extended instruction). One or more bits of the corresponding address can be concatenated to the instruction.

At Step 330, the processor 210 executes the concatenation (or extended instruction). The portion of the corresponding address contributes to determining the meaning for the extended instruction from the possible meanings.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of processing an instruction, said method comprising:
   fetching said instruction using a corresponding address from a memory unit, wherein a first meaning is associated with said instruction stored at said corresponding address by a processor with a first bit position from said corresponding address concatenated with said instruction, and wherein a second meaning is associated with said instruction stored at said corresponding address by said processor with a plurality of bit positions from said corresponding address concatenated with said instruction, wherein at least one of said plurality of bit positions is different from said first bit position;
   concatenating a portion of said corresponding address to said instruction to form an extended instruction; and
   executing said extended instruction.

2. The method as recited in claim 1 wherein said portion is an address bit.

3. The method as recited in claim 1 wherein said portion is a plurality of address bits.

4. The method as recited in claim 1 wherein a plurality of possible meanings associated with said instruction include an integer type of instruction and a floating point type of instruction.

5. A method, comprising:
   generating said instruction, wherein a first meaning is associated with said instruction stored at a corresponding address by a processor with a first bit position from said corresponding address concatenated with said instruction, and wherein a second meaning is associated with said instruction stored at said corresponding address by said processor with a plurality of bit positions from said corresponding address concatenated with said instruction, wherein at least one of said plurality of bit positions is different from said first bit position;
   storing said instruction at a particular address in a memory unit; and
   before executing said instruction, fetching said instruction using said particular address from a memory unit and concatenating said portion of said particular address to said instruction.

6. The method as recited in claim 5 wherein said portion is an address bit.

7. The method as recited in claim 5 wherein said portion is a plurality of address bits.

8. The method as recited in claim 5 wherein a plurality of possible meanings associated with said instruction include an integer type of instruction and a floating point type of instruction.

9. The method as recited in claim 5 wherein said generating said instruction and said storing said instruction are performed by a compiler.

10. A system comprising:
    a memory unit for storing a plurality of instructions at a plurality of addresses; and
    a processor operable to fetch a particular instruction from said memory unit by providing a corresponding address, wherein a first meaning is associated with said particular instruction stored at said corresponding address by a processor with a first bit position from said corresponding address concatenated with said particular instruction, and wherein a second meaning is associated with said particular instruction stored at said corresponding address by said processor with a plurality of bit positions from said corresponding address is concatenated with said particular instruction, wherein at least one of said plurality of bit positions is different from said first bit position, and wherein said processor is operable to concatenate a portion of said corresponding address to said particular instruction before executing said particular instruction.

11. The system as recited in claim 10 wherein said portion is an address bit.

12. The system as recited in claim 10 wherein said portion is a plurality of address bits.

13. The system as recited in claim 10 wherein a plurality of possible meanings associated with said instruction include an integer type of instruction and a floating point type of instruction.

14. The system as recited in claim 10 further comprising a compiler for generating said plurality of instructions and for storing each instruction at an appropriate address in said memory unit.

* * * * *

UNITED STATES PATENT AND TRADEMARK OFFICE
CERTIFICATE OF CORRECTION

PATENT NO. : 7,606,997 B1  Page 1 of 1
APPLICATION NO. : 10/623101
DATED : October 20, 2009
INVENTOR(S) : Rozas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 268 days.

Signed and Sealed this

Twelfth Day of October, 2010

David J. Kappos
*Director of the United States Patent and Trademark Office*